United States Patent Office 3,407,877
Patented Oct. 29, 1968

3,407,877
AQUEOUS FLUID DRIVE PROCESS
Robert R. Harvey and Michael M. Vaclaw, Bartlesville, Okla., assignors to Phillips Petroleum Company, a corporation of Delaware
No Drawing. Filed Apr. 28, 1967, Ser. No. 634,504
5 Claims. (Cl. 166—9)

ABSTRACT OF THE DISCLOSURE

An oil recovery process wherein an aqueous slug containing minute solids, an oil-displacing surfactant, a dispersing surfactant, and a high molecular weight polymer is driven through an oil stratum by an aqueous driving fluid to displace oil; the oil is produced from a well penetrating the stratum.

---

This invention relates to an aqueous fluid drive process for recovering oil from an oil-bearing stratum. In another aspect, this invention relates to increasing the efficiency of an aqueous fluid drive utilizing oil-displacing agents.

Certain minute solids such as carbon black, kaolin, and talc, when suspended in an aqueous driving fluid containing dissolved surfactants having oil-displacing properties, function as carriers for displacing surfactants and more effectively transporting the surfactants deeper into the stratum, thus displacing more oil.

Among surfactants effective in displacing oil are non-ionic surfactants having the formula R—R'—R"—OH wherein R is aliphatic alkyl of 9–20 carbon atoms having 0 to 4 methyl branches, or an alkyl aryl in which the alkyl has from 8–12 carbon atoms and the aryl is attached to the R', R' is O or S, and R" is a polyethylene oxide of an average of 4.5–6.5 units. They belong to the families of polyoxyethylene or polyphenoxyethylene ethers and thioethers. Certain surfactants have little or no oil-displacing properties, but have greater dispersing capacity than the oil-displacing surfactants. These are non-ionic surfactants having the formula R—O—R'—OH wherein R is an aliphatic alkyl of 5–20 carbon atoms or an alkyl aryl, the alkyl having 8–20 carbon atoms, and R' is polyethylene oxide of an average of 30–100 units or mols. The number of units of ethylene oxide in the hydrophilic chain is 30, surfactants with lesser chain having little or no dispersing effect when incorporated in the suspension of solids in the oil-displacing surfactant solution.

Oil is displaced from an oil-bearing stratum by incorporating one of the long chain dispersing type surfactants in an aqueous solution of oil-displacing surfactant containing a suspension of minute solid carriers for the surfactant and injecting a slug of the resulting aqueous suspension into the oil stratum in advance of an aqueous driving fluid such as steam and/or water. The solids are of a size in the range of 0.001 to 1 micron and the quantity is in the range of 0.05 to 2 weight percent of the solution. The concentration of oil-displacing surfactant is in the range of 0.001 to 2 weight percent and preferably 0.01 to 1 weight percent and a similar concentration of the dispersing surfactant is used. The size of the slug to be injected in such an aqueous fluid drive depends upon the particular characteristics of the stratum.

It has been found that the size of the above-described aqueous slug necessary to displace oil efficiently from the oil-bearing stratum can be considerably reduced by adding a high molecular weight water soluble polymer to the aqueous slug.

Accordingly, it is an object of this invention to recover oil from an oil-bearing stratum by an aqueous fluid drive process.

It is another object of the invention to provide a more stable suspension of minute solid carriers for injection in an aqueous fluid drive process.

A further object of the invention is to reduce the amount of aqueous driving fluid necessary to displace oil from an oil-bearing stratum.

Other objects and advantages of the invention will be apparent to one skilled in the art upon consideration of the specification and appended claims.

According to the invention, oil is produced from an oil-bearing stratum penetrated by a well bore by injecting into the stratum through the well bore an aqueous slug comprising a suspension of minute solids capable of being driven through the stratum, an oil-displacing surfactant in the solution, and a high molecular weight water soluble alkylene glycol polymer in the solution; thereafter driving the aqueous slug with a driving medium through the stratum so as to displace oil from the stratum; and producing the displaced oil from a well penetrating the stratum.

In one embodiment of the invention, the stratum is penetrated both by an injection well and a production well and the aqueous slug is driven toward the production well so as to displace oil into the production well.

The alkylene glycol polymer employed in the practice of the invention can be represented generally:

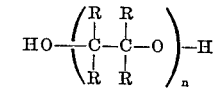

wherein $n$ has a value sufficient to give a molecular weight of from about 100,000 to 4.5 million, but preferably from 2 to 3 million. This high molecular weight polymer is incorporated in solution in the aqueous slug in a concentration in the range of 0.001 to 10 weight percent, preferably from 0.01 to 1.0 weight percent. The polymer comprises poly(ethylene oxide), poly(propylene oxide), poly(butylene oxide), other members of the homologous series, and copolymers thereof.

In the practice of the invention, the aqueous slug can be injected through an injection well and driven through the stratum by a driving medium, such as steam or water, to a production well penetrating the stratum so as to displace oil into the production well. An alternative method of producing oil through the practice of this invention is to inject the aqueous slug followed by a driving medium until the predetermined desired pressure is attained in the stratum, and back flowing effluents into the injection well by releasing or lowering the pressure in the injection well. These effluents comprise the aqueous slug of oil-displacing surfactant, minute solids carrier with the dispersing surfactant, high molecular weight polymer, the aqueous driving fluid, and displaced oil. By practice of the invention by either method, the volume of the aqueous slug necessary to displace a given volume of oil is reduced; for example, in the case of certain oil-bearing sands, the necessary pore volume is reduced by a factor of 2.

The following example will serve to further illustrate the invention.

Example

The oil-displacing properties of aqueous solutions are determined by tube displacement tests. A 6-foot long steel tube having a ¾-inch diameter is packed with reservoir sand from the Nacatoch formation of the Smackover Field, located in Ovachita County, Ark. The sand is packed in the tube to obtain a porosity of approximately 35 to 40 percent. The tube is wrapped with electrical heating tapes and the temperature controlled to obtain a temperature of about 120° F. (the temperature of the Nacatoch reservoir). The tube is then flooded with Smackover crude to obtain 100 percent oil saturation.

An aqueous flood solution of brine is prepared by adding 40 grams of sodium chloride, 10.5 grams of calcium chloride, 4.8 grams of magnesium chloride containing 6 molecules of hydration to 1 liter of water. The tube is then flooded at a rate of 1 milliliter per minute with the brine and the amount of oil produced and water-oil ratio is measured. Flooding is continued until a water-oil ratio of 100 is obtained and the per cent oil saturation is then determined. After these steps conditions in the tube approximate the conditions of a depleted reservoir.

Four displacement tubes are prepared as described above. Aqueous slugs are prepared by mixing the brine solution with surfactant-carrier, an oil-displacing surfactant, a dispersing surfactant and a polyalkylene glycol in various concentrations as noted in the table. Igepal CO-530, a nonylphenoxypolyethanol having an average chain length on the hydrophilic end of about 6.0 to 6.5 mols of ethylene oxide, is used as the oil-displacing surfactant. Igepal CO-990, a nonylphenoxypolyethanol having an average chain length on the hydrophilic end in the range of 95 to 100 mols or units of ethylene oxide, is used as the dispersing surfactant. Igepal CO-530 and Igepal CO-990 are trade names of Antara Chemical Division of General Aniline and Film Corporation. Philblack I (a trademark of Phillips Petroleum Company), a furnace black, is used as the particulate solid surfactant-carrier, illustrative of other surfactant-carriers. Polyox WSR-301, an ultra-high molecular weight ethylene oxide polymer, manufactured by Union Carbide Chemical Company, is used as the polyalkylene glycol additive.

Tube 1 is flooded with an additive slug which does not contain any polyalkylene glycol at a rate of 1 milliliter per minute until a water-oil ratio of 100 in the produced fluid is obtained. The amount of additional oil produced (on a percent saturation basis) and the amount of additive slug (on a pore volume basis) is then determined.

Tube 2 is flooded with an additive slug containing the polyalkylene glycol in the same manner as Tube 1.

Tube 3 is flooded with the same additive mixture as Tube 1; the size of the slug being reduced by one pore volume and the slug being driven with a pore volume of brine solution.

Tube 4 is flooded with the same additive mixture as Tube 2, but with a reduced pore volume driven by the brine solution.

The table shows the pore volumes of the various additive mixtures necessary to produce comparable amounts of oil from the tubes.

TABLE

| Tube No | 1 | 2 | 3 | 4 |
|---|---|---|---|---|
| Porosity (percent) | 37.8 | 37.8 | 34.1 | 35.6 |
| Oil Saturation After Flooding With Brine (percent) | 60.5 | 59.7 | 62.0 | 58.6 |
| Additive Slug Composition (weight percent): | | | | |
| Igepal CO-990 | 0.06 | 0.06 | 0.06 | 0.06 |
| Igepal CO-530 | 0.06 | 0.06 | 0.06 | 0.06 |
| Philblack I | 0.10 | 0.10 | 0.10 | 0.10 |
| Polyox WSR-301 | | 0.10 | | 0.10 |
| Oil Produced By Additive Flood (percent) | 18.0 | 17.8 | 17.6 | 17.8 |
| Total Additive Injected (pore volumes) | 7.0 | 1.37 | 6.0 | 0.40 |

As shown in the table, the addition of 0.10 weight percent Polyox WSR-301 reduces the pore volume of additive necessary to produce a given quantity of oil. This results in savings in additive costs plus reducing the time required to flood the reservoir.

Reasonable modification and variation are within the scope of this invention which sets forth a novel method of recovering hydrocarbons from a subsurface stratum.

That which is claimed is:

1. A process for producing oil from an oil-bearing stratum by an aqueous fluid drive comprising the steps of:

(1) injecting into said stratum through a well bore therein an aqueous slug comprising:
 (a) a suspension of minute solids capable of being driven through said stratum by an aqueous fluid drive;
 (b) a surfactant having the formula

wherein R is an aliphatic alkyl of 9-20 carbon atoms or an alkyl aryl of which the alkyl has 8-20 carbon atoms and the aryl is attached to R', R' is O or S, and R'' is polyethylene oxide of an average of 4 to 6.5 units in solution in a concentration in the range of 0.01 to 1 weight percent;
 (c) a surfactant having the formula

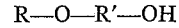

wherein R is an aliphatic alkyl of 5-20 carbon atoms or an alkyl aryl, the alkyl having 8-12 carbon atoms and the aryl is attached to the O, and R is polyethylene oxide of an average of 30-100 units in solution in a concentration in the range of 0.01 to 1 weight percent; and
 (d) a water soluble polymer represented by the general formula

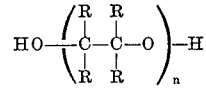

wherein $n$ is a value sufficient to give a polyalkylene glycol of a molecular weight from about 100,000 to 4.5 million in solution in a concentration in the range of 0.001 to 10 weight percent;

(2) thereafter injecting aqueous driving medium through said well into said stratum so as to drive said suspension in surfactant-polymer solution through said stratum so as to displace oil from said stratum; and (3) producing the displaced oil from a well bore penetrating said stratum.

2. The process of claim 1 wherein said stratum is penetrated by an injection well and a production well including the steps of:
 driving the slug of step 1 through said stratum toward said production well so as to displace oil and move same into said production well; and
 producing the displaced oil from said production well.

3. The process of claim 1 wherein said solids are particles of a size in the range of 0.001 to 1 micron selected from the group consisting of carbon black, kaolin, or talc.

4. The process of claim 1 wherein said water soluble polymer has a molecular weight of from 2 to 3 million in solution in a concentration of 0.01 to 1 weight percent.

5. The process of claim 1 wherein said water soluble polymer is selected from the group consisting of poly(ethylene oxide), poly(propylene oxide) and poly(butylene oxide).

References Cited

UNITED STATES PATENTS

| 3,148,730 | 9/1964 | Holbert | 166—9 |
| 3,323,589 | 6/1967 | Harvey | 166—9 |
| 3,326,287 | 6/1967 | Corrin | 166—9 |
| 3,332,486 | 7/1967 | McGhee | 166—9 |
| 3,346,047 | 10/1967 | Townsend et al. | 166—9 |
| 3,362,474 | 1/1968 | Purre | 166—9 |

STEPHEN J. NOVOSAD, Primary Examiner.